(12) United States Patent
Garcia et al.

(10) Patent No.: US 10,614,114 B1
(45) Date of Patent: Apr. 7, 2020

(54) SYSTEMS AND METHODS FOR CREATING COMPILATIONS BASED ON HIERARCHICAL CLUSTERING

(71) Applicant: GoPro, Inc., San Mateo, CA (US)

(72) Inventors: Vincent Garcia, Issy-les-Moulineaux (FR); Jean Caillé, Paris (FR)

(73) Assignee: GoPro, Inc., San Mateo, CA (US)

( * ) Notice: Subject to any disclaimer, the term of this patent is extended or adjusted under 35 U.S.C. 154(b) by 261 days.

(21) Appl. No.: 15/645,411

(22) Filed: Jul. 10, 2017

(51) Int. Cl.
*G06F 16/41* (2019.01)
*G06F 16/28* (2019.01)
*G06F 16/44* (2019.01)
*G06F 16/487* (2019.01)
*G06F 16/48* (2019.01)

(52) U.S. Cl.
CPC ............ *G06F 16/41* (2019.01); *G06F 16/287* (2019.01); *G06F 16/447* (2019.01); *G06F 16/487* (2019.01); *G06F 16/489* (2019.01)

(58) Field of Classification Search
None
See application file for complete search history.

(56) References Cited

U.S. PATENT DOCUMENTS

| | | |
|---|---|---|
| 6,633,685 B1 | 10/2003 | Kusama |
| 7,222,356 B1 | 5/2007 | Yonezawa |
| 7,483,618 B1 | 1/2009 | Edwards |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

PCT International Written Opinion for PCT/US2015/041624, dated Dec. 17, 2015, 7 Pages.

(Continued)

*Primary Examiner* — Grace Park
*Assistant Examiner* — J Mitchell Curran
(74) *Attorney, Agent, or Firm* — Esplin & Associates, PC

(57) ABSTRACT

Media items may be obtained. The media items may be characterized by capture information indicating a capture time and a capture location of individual media items. The media items may be clustered into scenes based on proximity of the capture times of the media items. The scenes may be clustered into collections based on proximity of the capture times and/or the capture locations of the media items within the scenes. The collections may be iteratively clustered into higher collections based on proximity of the capture times and/or the capture locations of the media items within the collections. One or more collections may be identified for inclusion in a media compilation based on a size of the identified collection(s). A media compilation, including one or more of the media items included in the identified collection(s), may be generated.

16 Claims, 7 Drawing Sheets

(56) References Cited

U.S. PATENT DOCUMENTS

| | | |
|---|---|---|
| 8,611,422 B1 | 12/2013 | Yagnik |
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,077,956 B1 | 7/2015 | Morgan |
| 9,142,257 B2 | 9/2015 | Woodman |
| 9,253,533 B1 | 2/2016 | Morgan |
| 9,342,376 B2 | 5/2016 | Jain |
| 9,396,385 B2 | 7/2016 | Bentley |
| 9,418,283 B1 | 8/2016 | Natarajan |
| 10,057,644 B1 * | 8/2018 | Farre Guiu .......... H04N 21/435 |
| 2002/0165721 A1 | 11/2002 | Chang |
| 2004/0001706 A1 | 1/2004 | Jung |
| 2004/0128317 A1 | 7/2004 | Sull |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0253735 A1 | 10/2008 | Kuspa |
| 2008/0313541 A1 | 12/2008 | Shafton |
| 2009/0019995 A1 | 1/2009 | Miyajima |
| 2009/0125559 A1 | 5/2009 | Yoshino |
| 2009/0213270 A1 | 8/2009 | Ismert |
| 2009/0252474 A1 | 10/2009 | Nashida |
| 2010/0046842 A1 | 2/2010 | Conwell |
| 2010/0086216 A1 | 4/2010 | Lee |
| 2010/0104261 A1 | 4/2010 | Liu |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093798 A1 | 4/2011 | Shahraray |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0293250 A1 | 12/2011 | Deever |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0141019 A1 | 6/2012 | Zhang |
| 2012/0210205 A1 | 8/2012 | Sherwood |
| 2012/0246114 A1 | 9/2012 | Edmiston |
| 2012/0283574 A1 | 11/2012 | Park |
| 2012/0311448 A1 | 12/2012 | Achour |
| 2013/0064476 A1 * | 3/2013 | Cohen ................. G06F 16/5866 |
| | | 382/305 |
| 2013/0136193 A1 | 5/2013 | Hwang |
| 2013/0151970 A1 | 6/2013 | Achour |
| 2013/0166303 A1 | 6/2013 | Chang |
| 2013/0182166 A1 | 7/2013 | Shimokawa |
| 2013/0195429 A1 | 8/2013 | Fay |
| 2013/0197967 A1 | 8/2013 | Pinto |
| 2013/0208942 A1 | 8/2013 | Davis |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0282747 A1 | 10/2013 | Cheng |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0330019 A1 | 12/2013 | Kim |
| 2013/0343727 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0161351 A1 | 6/2014 | Yagnik |
| 2014/0165119 A1 | 6/2014 | Liu |
| 2014/0169766 A1 | 6/2014 | Yu |
| 2014/0188890 A1 * | 7/2014 | Clifton .................... G06F 16/51 |
| | | 707/740 |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0067811 A1 | 3/2015 | Agnew |
| 2015/0071547 A1 | 3/2015 | Keating |
| 2015/0113009 A1 | 4/2015 | Zhou |
| 2015/0156247 A1 | 6/2015 | Hensel |
| 2015/0186073 A1 | 7/2015 | Pacurariu |
| 2015/0287435 A1 | 10/2015 | Land |
| 2015/0318020 A1 | 11/2015 | Pribula |
| 2015/0373281 A1 | 12/2015 | White |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0094601 A1 | 3/2016 | Besehanic |
| 2016/0103830 A1 | 4/2016 | Cheong |
| 2016/0189752 A1 | 6/2016 | Galant |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |
| 2016/0292881 A1 | 10/2016 | Bose |
| 2016/0358603 A1 | 12/2016 | Azam |
| 2016/0366330 A1 | 12/2016 | Boliek |
| 2017/0013144 A1 * | 1/2017 | Chen .................. H04N 1/00167 |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |

(56) References Cited

FOREIGN PATENT DOCUMENTS

| WO | 2012057623 | | 5/2012 |
|---|---|---|---|
| WO | 2012057623 | A1 | 5/2012 |
| WO | 2012086120 | A1 | 6/2012 |

OTHER PUBLICATIONS

PCT International Search Report and Written Opinion for PCT/US15/12086 dated Mar. 17, 2016, 20 pages.
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.
PCT International Search Report and Written Opinion for PCT/US2015/023680, dated Oct. 6, 2015, 13 pages.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
PCT International Search Report for PCT/US15/41624 dated Nov. 4, 2015, 5 pages.
PCT International Search Report for PCT/US15/23680 dated Aug. 3, 2015, 4 pages.
PSonar URL: http://www.psonar.com/about retrieved on Aug. 24, 2016, 3 pages.
PCT International Preliminary Report on Patentability for PCT/US2015/023680, dated Oct. 4, 2016, 10 pages.
Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding.html>.
FFmpeg, "Muxing," Doxygen, Jul. 20, 2014, 9 Pages, [online] [retrieved on Jul. 13, 2015] Retrieved from the Internet <URL: https://www.ffmpeg.org/doxyg en/2. 3/structA VP a ck et. html>.
FFmpeg, "AVPacket Struct Reference," Doxygen, Jul. 20, 2014, 24 Pages, [online] [retrieved on Jul. 13, 2015] Retrieved from the Internet <URL:https://www.ffmpeg.org/doxygen/2.5/group_lavf_decoding.html>.
Japanese Office Action for JP Application No. 2013-140131, dated Aug. 5, 2014, 6 pages.
Office Action for U.S. Appl. No. 13/831,124, dated Mar. 19, 2015, 14 pages.
Ernoult, Emeric, "Flow to Triple Your YouTube Video Views with Facebook", SocialMediaExaminer.com, Nov. 26, 2012, 16 pages.

* cited by examiner

24 Hour Period

24 Hour Period

24 Hour Period

24 Hour Period

SYSTEMS AND METHODS FOR CREATING COMPILATIONS BASED ON HIERARCHICAL CLUSTERING

FIELD

This disclosure relates to iteratively clustering media items into a hierarchy of collections and creating media compilations based on the hierarchy of collections.

BACKGROUND

A user's media library may include multiple media items (e.g., images, videos). Manually sorting through the media library to create media compilations may be difficult and time consuming.

SUMMARY

This disclosure relates to creating compilations based on hierarchical clustering. Media items, including two or more images, may be obtained. The media items may be characterized by capture information indicating a capture time and a capture location of individual media items. The media items may be clustered into scenes based on proximity of the capture times of the media items. The scenes may be clustered into collections based on proximity of the capture times and/or the capture locations of the media items within the scenes. The collections may be iteratively clustered into higher collections based on proximity of the capture times and/or the capture locations of the media items within the collections. The iterative clustering of the collections may result in a hierarchy of a scene level and two or more collection levels. One or more of the collections may be identified for inclusion in a media compilation based on a size of the identified collection(s). The media compilation may be generated. The media compilation may include one or more of the media items included in the identified collection(s).

A system that creates compilations based on hierarchical clustering may include one or more processors and/or other components. The processor(s) may be configured by machine-readable instructions. Executing the machine-readable instructions may cause the processor(s) to creating compilations based on hierarchical clustering. The machine-readable instructions may include one or more computer program components. The computer program components may include one or more of a media item component, a cluster component, an identification component, a media compilation component, and/or other computer program components.

The media item component may be configured to obtain media items and/or other information. The media items may include two or more images. In some implementations, the media items may include one or more video. The media items may be characterized by capture information and/or other information. The capture information may indicate a capture time, a capture location, and/or other characteristics of individual media items. In some implementations, the media item component may be configured to obtain additional media items.

The cluster component may be configured to cluster the media items into one or more scenes based on proximity of the capture times of the media items and/or other information. The cluster component may be configured to cluster the scenes into one or more collections based on proximity of the capture times and/or the capture locations of the media items within the scenes and/or other information. The cluster component may be configured to iteratively cluster the collections into higher collections based on proximity of the capture times and/or the capture locations of the media items within the collections and/or other information. The iterative clustering of the collections may result in a hierarchy of a scene level, two or more collection levels, and/or other levels. In some implementations, the collections may be iteratively clustered until the media items are clustered within a single highest collection. In some implementations, the cluster component may be configured to cluster additional media items. Additional media items may be clustered without altering one or more (e.g., majority) of the existing collections.

The identification component may be configured to identify one or more of the collections for inclusion in a media compilation based on a size of the identified collection(s) and/or other information. In some implementations, the size of the identified collection(s) may be determined based on an amount of media items, an amount of scenes, a time duration covered by the media items or the scenes, a capture location covered by the media items or the scenes within the identified collection(s), and/or other information.

In some implementations, the identification component may be configured to identify one or more of the collections for inclusion in a media compilation based on a compacity of the media items within the identified collection(s) and/or other information. In some implementations, the compacity of the media items within the identified collection(s) may be determined based on differences in the capture times of the media items within the identified collection(s) and/or other information In some implementations, the identification component may be configured to identify one or more of the collections for inclusion in a media compilation based on a diversity of the media items within the identified collection(s) and/or other information. In some implementations, the diversity of the media items within the identified collection(s) may be determined based on a standard deviation of the capture times of the media items within the identified collection(s) and/or other information.

The media compilation component may be configured to generate one or more media compilations. The media compilation(s) may include one or more of the media items included in the identified collection(s) and/or other media items. In some implementations, the media compilation(s) may include all of the media items included in the identified collection(s). In some implementations, the media compilation(s) may include a subset of the media items included in the identified collection(s). The subset of the media items may be included in the media compilation(s) based on content of the subset of the media items and/or other information. In some implementations, generating the media compilation may include generating one or more video summaries. A video summary may include one or more of the media items included in the identified collection(s).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
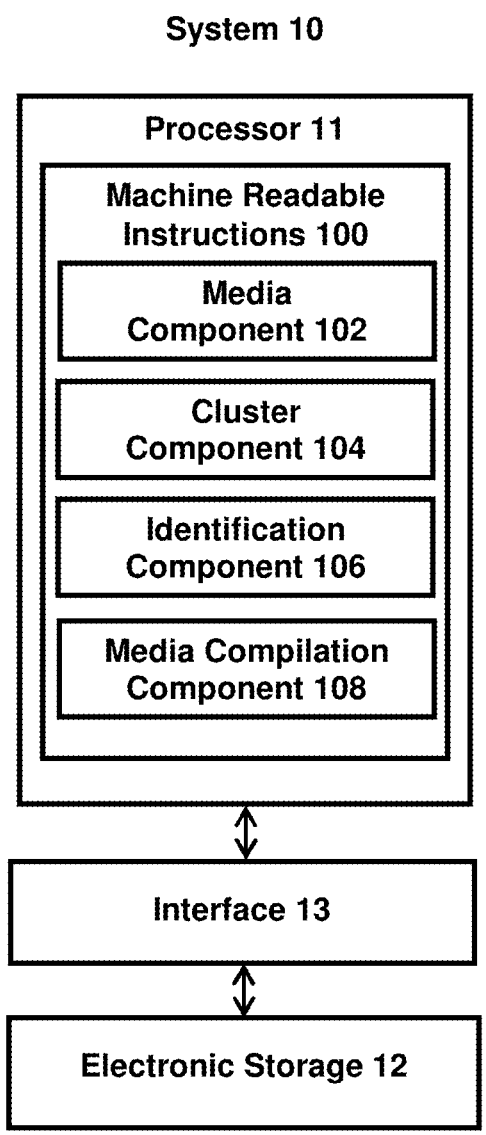
FIG. 1 illustrates a system that creates compilations based on hierarchical clustering.

FIG. 1 illustrates a system 10 for creating compilations based on hierarchical clustering. The system 10 may include one or more of a processor 11, an electronic storage 12, an interface 13 (e.g., bus, wireless interface), and/or other components. Media items, including two or more images, may be obtained by the processor 11. The media items may be characterized by capture information indicating a capture time and a capture location of individual media items. The media items may be clustered into scenes based on proximity of the capture times of the media items. The scenes may be clustered into collections based on proximity of the capture times and/or the capture locations of the media items within the scenes. The collections may be iteratively clustered into higher collections based on proximity of the capture times and/or the capture locations of the media items within the collections. The iterative clustering of the collections may result in a hierarchy of a scene level and two or more collection levels. One or more of the collections may be identified for inclusion in a media compilation based on a size of the identified collection(s). The media compilation may be generated. The media compilation may include one or more of the media items included in the identified collection(s).

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to media items, scenes, collections, clustering media items, clustering scenes, clustering collections, media compilation, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate creating compilations based on hierarchical clustering. The machine readable instructions 100 may include one or more computer program components. The machine readable instructions 100 may include one or more of a media item component 102, a cluster component 104, an identification component 106, a media compilation component 108, and/or other computer program components.

The media item component 102 may be configured to obtain media items and/or other information. Obtaining media items may include one or more of accessing, acquiring, analyzing, determining, examining, locating, receiving, retrieving, reviewing, storing, and/or otherwise obtaining the media items. The media items may be located/organized in the same location or in different locations. For example, media items may be located in the same storage device or in different storage devices. The media items may be located within the same folder, within different folders, within the same root folder, or within different root folders. In some implementations, the media item component 102 may be configured to obtain additional media items. For example, the media item component 102 may obtain additional media items after previously obtained media items have been clustered into scenes and/or collections as described below. The media item component 102 may iteratively obtain media items for clustering.

The media items may refer to items that may be visually and/or audibly consumed. The media items may have been captured by one or more sensors (e.g., image sensors, audio sensors). The media items may have been processed by one or more hardware and/or one or more software (e.g., encoded, edited). As non-limiting examples, media items may include images, videos, and/or other media items. For example, media items obtained by the media item component 102 may include image(s) and/or video(s). Media items obtained by the media item component 102 may include media items of same type or different types. For example, media items obtained by the media item component 102 may be all images, all videos, or all media items of a certain type. Media items obtained by the media item component 102 may include one or more images, one or more videos, and/or other media times of other type(s).

The media items may be characterized by capture information and/or other information. The capture information may indicate a capture time, a capture location, and/or other characteristics of individual media items. The capture information may characterize the whole media item or one or more portions of the media items. The capture information may include general information applicable to the whole media item (e.g., time/location of capture for a single image) and/or specific information applicable to certain portions of the media item (e.g., times/locations of capture of a set of multiple images captured by burst mode/time-lapse mode/live image mode; times/locations of capture of a video).

The capture information may be part of media information (e.g., image file, video file) defining the media items and/or separate from the media information defining the media items. The capture information may be stored with the media information (e.g., stored as part of the media file, metadata included in the media file) or separately from the media information (stored as a file separate from the media file, metadata not included in the media file).

In some implementations, the media item component 102 may be configured to determine the capture information and/or other information from the media items. For example, the media item component 102 may analyze the media files to determine (1) capture times, (2) capture locations, (3) media types (e.g., image, live image, video, audio), and/or other information about the media items.

The cluster component 104 may be configured to cluster the media items into one or more scenes based on proximity of the capture times of the media items and/or other information. A scene may refer to a cluster (e.g., set, group) of one or more media items. Media items that were captured within a certain time duration (e.g., scene time duration) may be clustered together into a scene. Media items may be clustered into a scene based on how closely in time (e.g., scene time duration) the media items were captured and/or other information. The cluster component 104 may compare the capture information of the media items to determine when the media items were captured and/or how closely in time the media items were captured.

A scene may include media items captured within one or more scene time durations. For example, the cluster component 104 may cluster into a single scene media items captured within a one-minute duration (e.g., from 9:30 A.M. to 9:31 A.M.). A scene may include media items that were captured within scene time duration of each other. For example, the cluster component 104 may cluster into a single scene media items that were captured within 30 seconds of each other (e.g., an image captured at 9:00:00 AM, an image captured at 9:00:10, a video captured from 9:00:30 to 9:01:30, an image captured at 9:01:40).

Figure 3A:
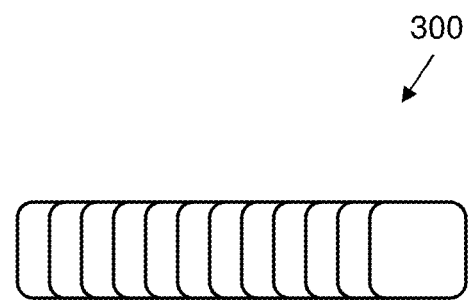
FIG. 3A illustrates example media items.
Figure 3B:
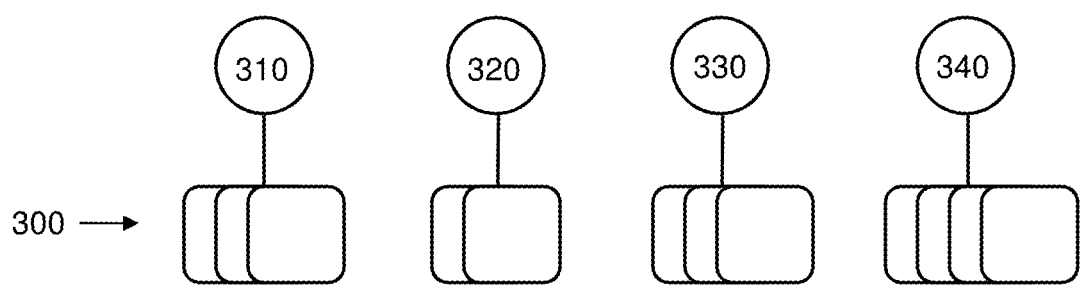
FIG. 3B illustrates example media items and scenes.

Clustering media items into scenes based on scene time duration may enable the cluster component 104 to group/organize media items that were captured near in time (e.g., cluster close/closest media items together). For example, FIG. 3A illustrates example media items 300. The media items 300 may include twelve media items obtained by the media item component 102. The cluster component 104 may cluster the media items 300 into one or more scenes based on proximity of the capture times of the media items 300 and/or other information. For example, as shown in FIG. 3B, the media items 300 may be clustered into four scenes 310, 320, 330, 340, and/or other scenes. The scene 310 may include three of the media items 300. The scene 320 may include two of the media items 300. The scene 330 may include three of the media items 300. The scene 340 may include four of the media items 300. The scenes 310, 320, 330, 340 may not include overlapping media item—i.e., individual ones of the media items 300 only appear in one of the scenes 310, 320, 330, 340.

A scene time duration may be defined in terms of numbers of seconds, minutes, hours, days, weeks, months, years, and/or other times durations. The scene time duration may be static or variable. The scene time duration may be set based on one or more of system default, user input, capture times of the media items, content of the media items, and/or other information. For example, the scene time duration may be set based on a system default specifying one or more particular values (e.g., one minute). The scene time duration may be set based on user input specifying one or more particular values (e.g., setting a new scene time duration, changing a previous scene time duration).

The scene time duration may be set based on analysis of the capture times of the media items. For example, the capture times of the media items may be analyzed to determine one or more of range and/or frequency of the capture times, and the scene time duration may be determined based on the range and/or the frequency. Determining the scene time duration based on the capture times of the media items may enable the cluster component 104 to organize media items into scenes of different time durations based on the range of times during which the media items were captured and/or based on the time intervals between captures of the media items.

The scene time duration may be set based on content of the media items. For example, the content of the media items may be analyzed to determine the objects/person, scene, context, activity, action, and/or other information about the content of the media items. The scene time duration may be set based on the content such that different content/types of content may result in different scene time duration. For example, the scene time duration for a surfing activity may be different (e.g., shorter) than the scene time duration for a gliding activity. Other durations and determinations of scene time duration are contemplated.

The cluster component 104 may be configured to cluster the scenes into one or more collections based on proximity of capture times and/or capture locations of the media items within the scenes and/or other information. A collection may refer to a cluster (e.g., set, group) of scenes. Scenes including media items that were captured within a certain time duration (e.g., collection time duration) and/or within certain location(s) (collection location threshold) may be clustered together into a collection. Scenes may be clustered into a collection based on how closely in time (e.g., collection time duration) and/or how closely in location (e.g., scene location threshold) the media items within the scenes were captured and/or other information. The cluster component 104 may compare the capture information of the media items within the scenes to determine when/where the media items were captured and/or how closely in time/location the media items were captured. Clustering the scenes into collections based on capture times and/or capture locations may enable the cluster component 104 to cluster close/closest scenes (in time and/or in location) into a collection.

A collection may include scenes with media items captured within one or more collection time durations. For example, the cluster component 104 may cluster into a single collection scenes with media items captured within a certain time duration. A collection may include scenes with media items that were captured within collection time duration of each other. For example, the cluster component 104 may cluster into a single collection scenes with media items that were captured within a certain time interval (collection time duration) of each other.

Figure 3C:
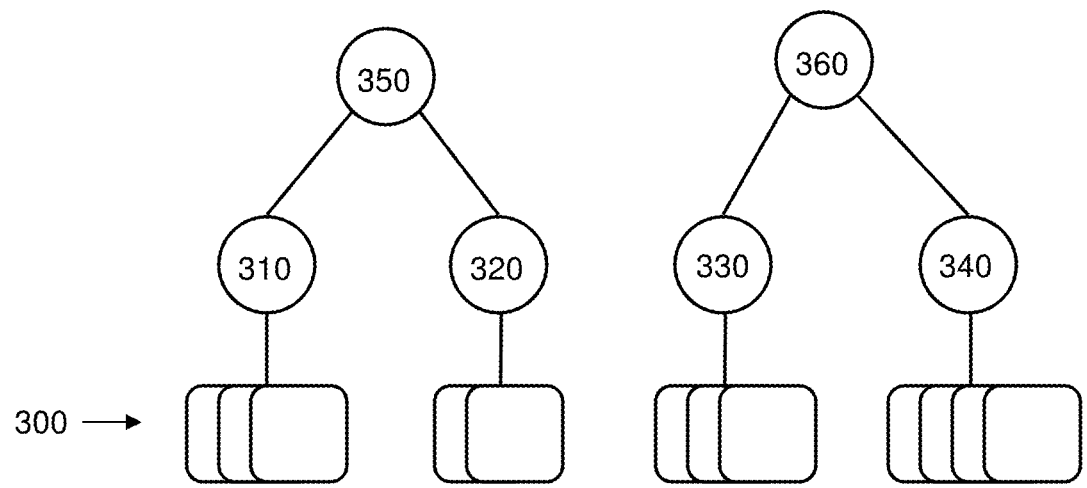
FIGS. 3C-3E illustrate example media items, scenes, and collections.

Clustering scenes into collections based on collection time duration may enable the cluster component 104 to group/organize scenes with media items that were captured near in time (e.g., cluster close/closest scenes together). For example, referring to FIG. 3C, the scenes 310, 320 may be clustered into a collection 350, and the scenes 330, 340 may be clustered in a collection 360 based on proximity of the capture times of the media items 300 within the scenes 310, 320, 330, 340. The collections 350, 360 not include overlapping scenes/media item—i.e., individual scenes 310, 320, 330, 340 only appear in one of the collections 350, 360.

A collection time duration may be defined in terms of numbers of seconds, minutes, hours, days, weeks, months, years, and/or other times durations. The collection time duration may be static or variable. The collection time duration may be set based on one or more of system default, user input, capture times of the media items, content of the media items, and/or other information. For example, the collection time duration may be set based on a system default specifying one or more particular values. The collection time duration may be set based on user input specifying one or more particular values (e.g., setting a new collection time duration, changing a previous collection time duration).

The collection time duration may be set based on analysis of the capture times of the media items. For example, the capture times of the media items may be analyzed to determine one or more of range and/or frequency of the capture times, and the collection time duration may be determined based on the range and/or the frequency. Determining the collection time duration based on the capture times of the media items may enable the cluster component 104 to organize scenes into collections of different time durations based on the range of times during which the media items were captured and/or based on the time intervals between captures of the media items.

The collection time duration may be set based on content of the media items. For example, the content of the media items may be analyzed to determine the objects/person, scene, context, activity, action, and/or other information about the content of the media items. The collection time duration may be set based on the content such that different content/types of content may result in different collection time duration. For example, the collection time duration for a diving activity may be different (e.g., shorter) than the collection time duration for a hiking activity. Other durations and determinations of collection time duration are contemplated.

A collection may include scenes with media items captured within locations meeting one or more collection location thresholds. A collection location threshold may define one or more geographical location and/or one or more geographical distances. For example, a collection location threshold may define a type of and/or a specific geographical location (e.g., country, state, city, neighborhood, zip code, place) and/or a particular/range of distances (e.g., straight-line distance, distance traveled by the image capture device(s), difference in altitude/latitude, difference in elevation). Scenes with media items that were captured within locations meeting the collection location threshold (e.g., captured within a particular location defined by the collection location threshold, captured within a proximity defined by the collection location threshold) may be clustered into a collection. For example, the cluster component 104 may cluster into a single collection scenes with media items captured at a specific geographical location. The cluster component 104 may cluster into a single collection scenes with media items captured at locations within a certain distance from each other.

Clustering scenes into collections based on collection location threshold may enable the cluster component 104 to group/organize scenes with media items that were captured near in location (e.g., cluster close/closest scenes together). For example, referring to FIG. 3C, the scenes 310, 320 may be clustered into a collection 350, and the scenes 330, 340 may be clustered in a collection 360 based on proximity of the capture locations of the media items 300 within the scenes 310, 320, 330, 340. The collections 350, 360 not include overlapping scenes/media item—i.e., individual scenes 310, 320, 330, 340 only appear in one of the collections 350, 360.

The collection location threshold may be static or variable. The collection location threshold may be set based on one or more of system default, user input, capture locations of the media items, content of the media items, and/or other information. For example, the collection location threshold may be set based on a system default specifying one or more particular values. The collection location threshold may be set based on user input specifying one or more particular values (e.g., setting a new collection location threshold, changing a previous collection location threshold).

The collection location threshold may be set based on analysis of the capture locations of the media items. For example, the capture locations of the media items may be analyzed to determine one or more of range and/or frequency of the capture locations, and the collection location threshold may be determined based on the range and/or the frequency. Determining the collection location threshold based on the capture locations of the media items may enable the cluster component 104 to organize scenes into collections of different locations based on the range of locations in which the media items were captured and/or based on the distances between captures of the media items.

The collection location threshold may be set based on content of the media items. For example, the content of the media items may be analyzed to determine the objects/person, scene, context, activity, action, and/or other information about the content of the media items. The collection location threshold may be set based on the content such that different content/types of content may result in different collection location threshold. For example, the collection location threshold for a skating activity may be different (e.g., shorter) than the collection location threshold for a biking activity. Other locations/distances and determinations of collection location threshold are contemplated.

The scenes and/or collections may be clustered based on geographical distances and/or time distances. Rather than setting time durations and/or location thresholds, media items within individual scenes and individual collections may be analyzed to determine geographical distances and/or time distances between the scenes and/or collections. A scene may be clustered with another scene, a scene may be clustered with a collection, and/or a collection may be clustered with another collection based on the different geographical distances and/or time distances of the scenes and collections. Such clustering of scene/scene, scene/collection, collection/collection may provide for a flexible clustering approach that adapts to the media item capturing patterns of different users.

Figure 3D:
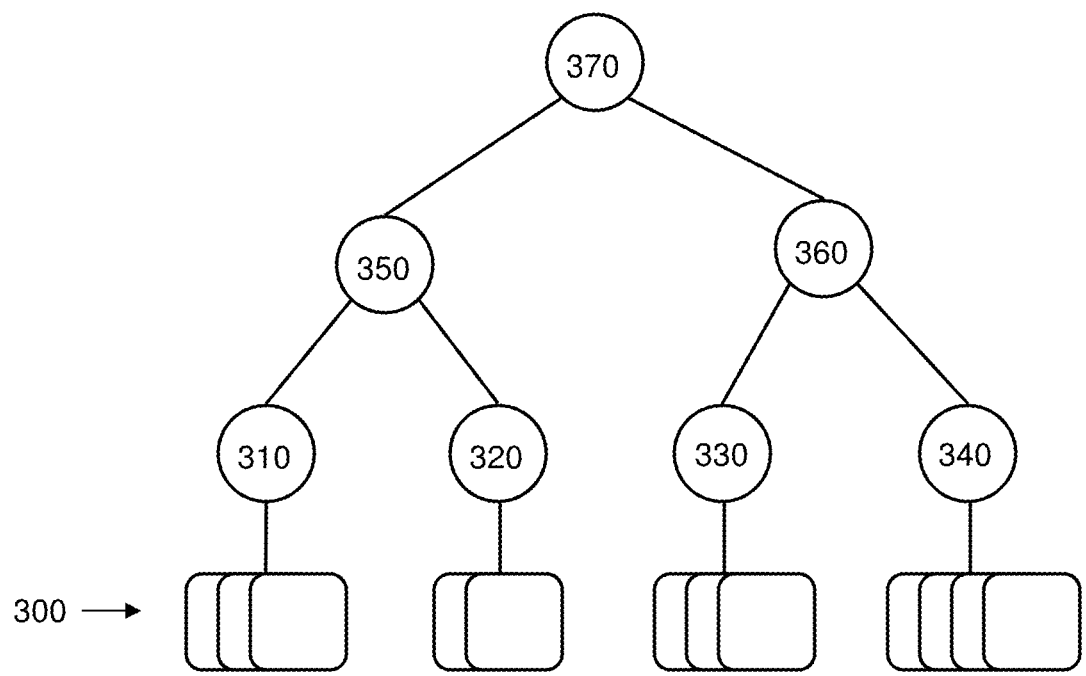

The cluster component 104 may be configured to iteratively cluster the collections into higher collections based on proximity of the capture times and/or the capture locations of the media items within the collections and/or other information. A higher collection may refer to a collection including one or more collection. A higher collection may include one or more lower collections. For example, referring to FIG. 3D, the cluster component 104 may cluster collections 350, 360 into a collection 370. The collection 370 may be a higher collection and the collections 350, 360 may be lower collections. The terms higher and lower are merely used for ease of reference and are not limiting. For example, while the collections in FIG. 3D are organized in a top-down manner (higher collection being above lower collections), collections may be organized in a down-top manner, left-right manner, right-left manner, and/or any other directions.

The iterative clustering of the collections may result in a hierarchy of a scene level, two or more collection levels, and/or other levels. For example, referring to FIG. 3D, a scene level may include scenes 310, 320, 330, 340; a first collection level may include the collections 350, 360; a second collection level may include the collection 370. In some implementations, the collections may be iteratively clustered until the media items are clustered within a single highest collection. For example, the collection 370 may be the single highest collection. In some implementations, the media items may be clustered within multiple highest collections.

The hierarchy of scenes and collections may provide for structuring of media items in terms of capture times, capture locations, and/or other information. For example, a collection may include multiple scenes that have some commonality in terms of capture times and/or capture location. The scenes may include media items spanning a (small) time duration captured at the same location or near each other. For example, a collection may include images/videos of a skating activity at different skate parks, and scenes may include those images/videos captured at individual skate parks.

The hierarchy of scenes and collections may be static or flexible. The hierarchy of scenes and collections may be set and all media items may be clustered into the set hierarchy. The hierarchy of scenes and collection may be flexible (e.g., dynamically determined) so that the capture information of the media items may be used to determine how the media items will be divided into scenes and collections (one or multiple levels of collection). For example, the highest collection(s) may correspond to a week, and the highest collection(s) may be subdivided into collections corresponding to single days of the week. The collection of single days may be further subdivided based on nearness of capture time and/or capture location. As another example, the highest collection(s) may correspond to a particular continent (e.g., Europe, Asia), and the highest collection(s) may be subdivided into collections corresponding to different countries. The collection of countries may be further subdivided into different regions inside the countries and/or different days/amount of time within the countries. Other division of the hierarchy of scenes and collections are contemplated.

In some implementations, the cluster component 104 may be configured to cluster additional media items. The additional media items may have been obtained by the media item component 102 after previously obtained media items have been clustered into scenes and/or collections as described above. The additional media items may be clustered into existing scenes and/or collections, or may be clustered into new scenes and/or collections. The additional media items may be clustered without altering one or more (e.g., majority) of the existing collections. The cluster component 104 may iteratively cluster additional media items.

In some implementations, one or more scenes/collections may be fixed. A fixed scene/collection may not be altered when additional media items are added to the hierarchy of scenes/collections. A scene/collection may be fixed based on capture times of media items within the scene/collection. For example, if the difference between the current time and the capture time of the most recent media item in the scene/collection is higher than a threshold, the scene/collection may be fixed. The threshold may be static or dynamic (e.g., determined based on the average time between the media items). For example, if a collection's most recent media item is twenty times older than the average time between the media items in the collection, the collection may be fixed so that it is not altered based on addition of media items to the hierarchy of scenes/collections.

Figure 3E:
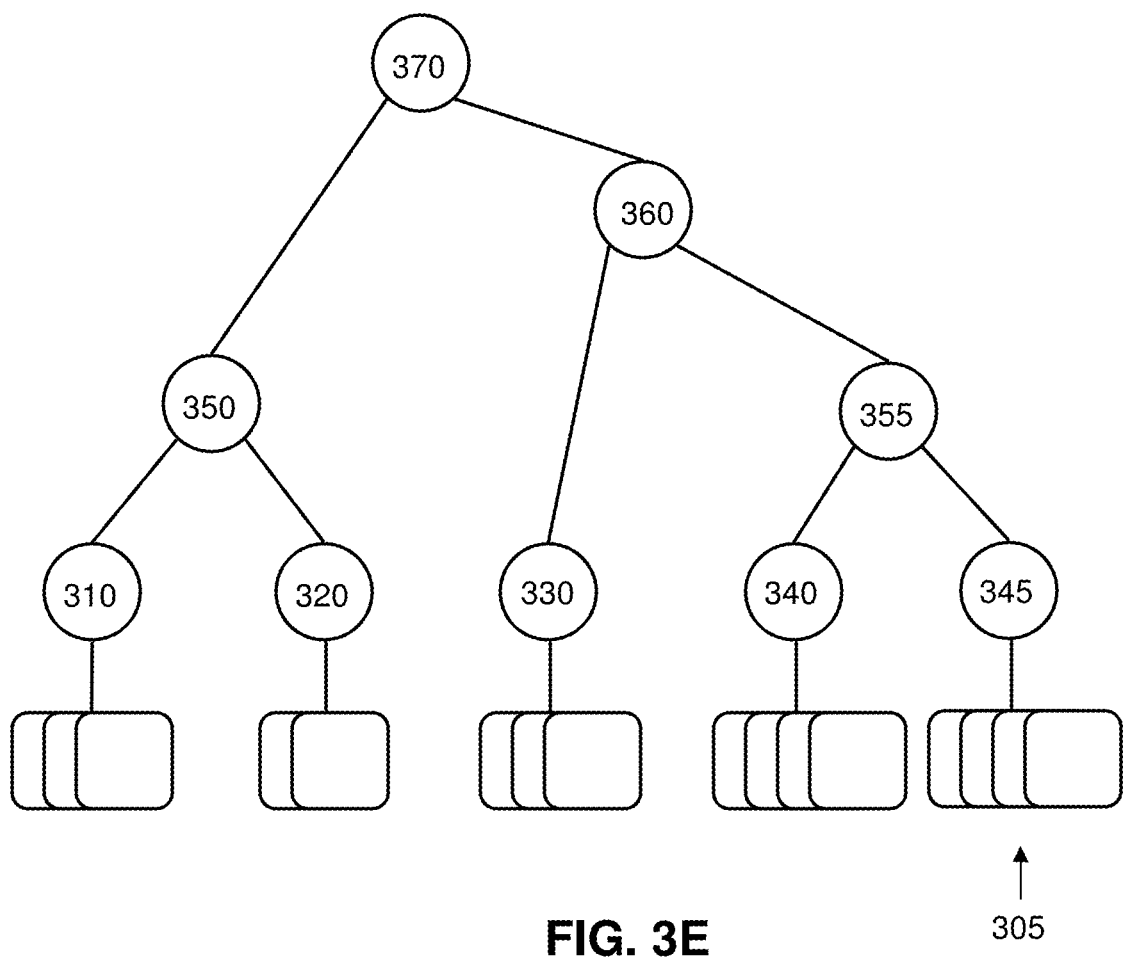

In some implementations, one or more scenes/collections may not be fixed and addition of new media items may alter the scenes/collections. For example, referring to FIG. 3D, the scenes 310, 320, 330 and the collection 350 may be fixed. The media component 102 may obtain additional media items 305 (shown in FIG. 3E). The additional media items 305 may be clustered in a scene 345. Based on the fixing of the scenes 310, 320, 330 and the collection 350, the scene 345 may be clustered into a new collection 355 including the scenes 340, 345. The collection 355 may be clustered into the collection 360 (which includes the collection 330). Fixing one or more of the scenes/collections may allow for continuity in media items identified for presentation and/or included in a media compilation. Fixing of scenes/collections may enable creation of a hierarchical structure without having to recompute the entirety of the hierarchical structure. When new media items are added to the hierarchy of scenes/collections, media items within fixed scenes/collection may not have to be reanalyzed/reclustered. Fixing of scenes/collections may enable clustering of media items/showing clusters before all the media items have been added (e.g., all media items have not been processed, user captures new media items).

The identification component 106 may be configured to identify one or more of the collections (and/or scenes) for inclusion in one or more media compilations based on a size of the identified collection(s) (and/or scenes) and/or other information. A media compilation may refer to a grouping of one or more media items. A media compilation may be generated to provide a view of one or more media items organized in a hierarchy of scenes and collections. The size of the identified collection(s) may refer to one or more measures/metric that characterize the extent(s) of the identified collection and/or other information. In some implementations, the size of the identified collection(s) may be determined based on one or more of an amount of media items, an amount of scenes, a time duration covered by the media items or the scenes within the identified collection(s), capture locations covered by the media items or the scenes within the identified collections, and/or other information. For example, the identification component 106 may identify collection(s) for inclusion in a media compilation so that the media compilation will include a certain number (e.g., 200) or a range of media items (e.g., 190-210), will include less than a certain number of media items (e.g., 300), and/or will include more than a certain number of media items (e.g., 199).

In some implementations, the identification component 106 may be configured to identify one or more of the collections for inclusion in a media compilation based on a compacity of the media items within the identified collection(s) and/or other information. Compacity of media items may refer to how closely the media items were captured in time and/or location. For example, compacity of media items may refer to the average of capture time/location differences between the media items. Compacity of media items within the identified collection(s) may be determined based on differences in the capture times/locations of the media items within the identified collection(s) and/or other information. For example, the identification component 106 may identify one or more collections for inclusion in a media compilation such that the identified media items have an average capture time difference of about 30 minutes. Other values for compacity of media items are contemplated.

In some implementations, the identification component 106 may be configured to identify one or more of the collections for inclusion in a media compilation based on a diversity of the media items within the identified collection(s) and/or other information. Diversity of media items may refer to the extent to which how spread out the media items were captured in time and/or location. Diversity of media items within the identified collection(s) may be determined based on a standard deviation of the capture times/locations of the media items within the identified collection(s) and/or other information. For example, the identification component 106 may identify one or more collections for inclusion in a media compilation such that the identified media items are characterized by a time/location standard deviation of 1.99. Other values for diversity of media items are contemplated.

In some implementations, a given collection may be identified for inclusion in a media compilation. The given collection may include one or more child collections (e.g., lower collections within the given collection). The given collection may be compared with the child collection(s) to determine whether one or more of the collection may provide better media compilation. A child collection may provide a better media compilation than the parent collection if the child collection (1) contains most of the media items within the parent collection, (2) has higher compacity than the parent collection, and/or (3) has lower diversity than the parent collection. For example, a parent collection may include thirty-six media items, which were captured on two Monday and Tuesday. A first child collection may include thirty-five media items captured on Monday, and a second child collection may include one media item captured on Tuesday. The parent collection may be compact and diverse enough to for inclusion in a media compilation. However, using the first child collection may result in a better media compilation as it contains most of the medias from the parent collection and provides for higher compacity/lower diversity.

In some implementations, the identification component 106 may give priority/preference to collections based on proximity of their connection within the hierarchy of scenes and collections. For example, referring to FIG. 3E, the identification component 106 may determine that a combination of collections 330, 355 or a combination of collections 310, 355 may be identified for inclusion in a media compilation. The collections 330, 355 (which are included in the collection 360) may be identified based on giving priority/preference to collections with closer proximity. The collections 310, 355 may be identified based on giving priority/preference to collections with farther proximity.

Figure 4A:
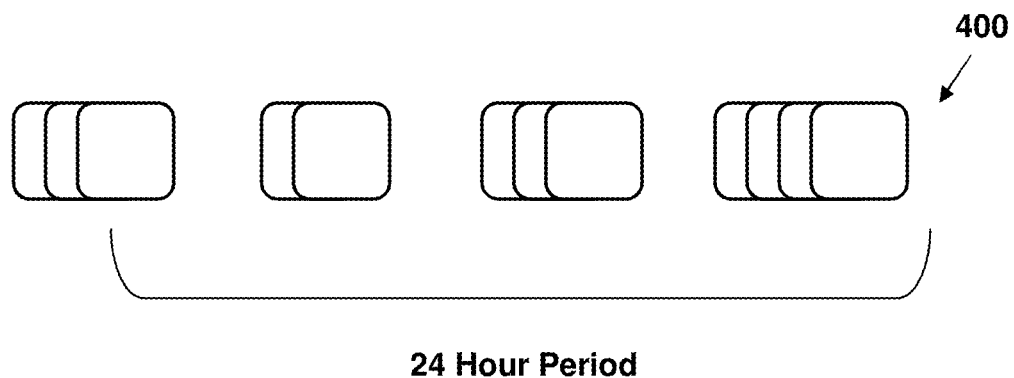
FIGS. 4A-4D illustrate example advantages of clustering media items.
Figure 4B:
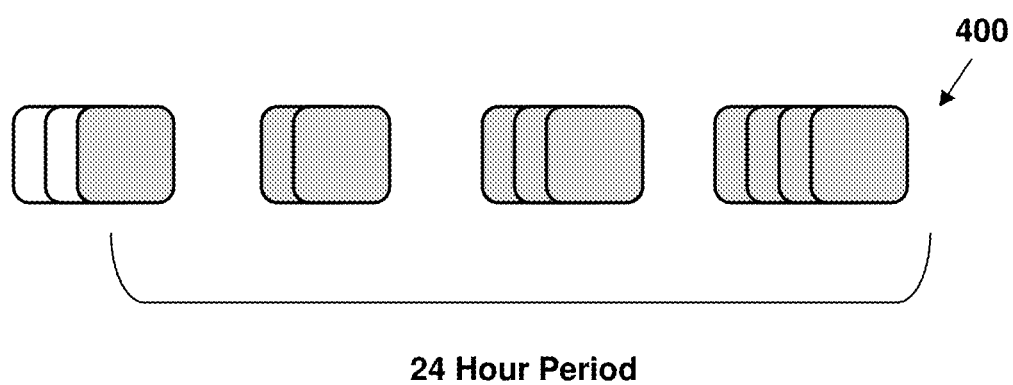

Clustering media items into scenes/collections may allow for selection of media items based on the scenes/collections. For example, an application may allow a user to see a compilation (e.g., slide presentation, video summary) of media items captured within a certain time duration (e.g., within a 24 hour period). For example, a user may have captured media items 400 (shown in FIG. 4A), a portion of which were captured within a 24 hour period. The media items 400 may be shown in FIG. 4A as separated based on scenes/collections (a grouping of media items is a scene/collection). FIG. 4B shows an example naïve selection of media items captured within a twenty-four hour period. In FIG. 4B, the selected media items are shown as shaded and unselected media items shown as unshaded. Simply selecting to view the media items captured within the 24 hour period may result in cutting off of media items included in the left scene/collection. That is, the 24 hour period may only include one media item from the three media items included in the left scene/collection.

Figure 4C:
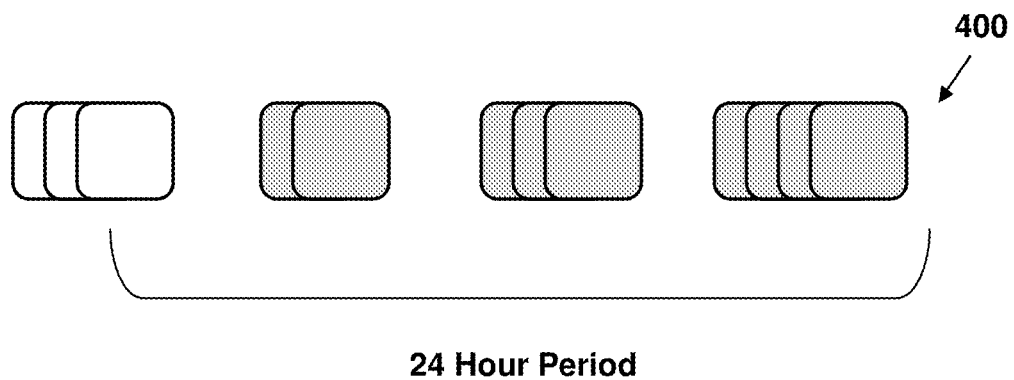
Figure 4D:
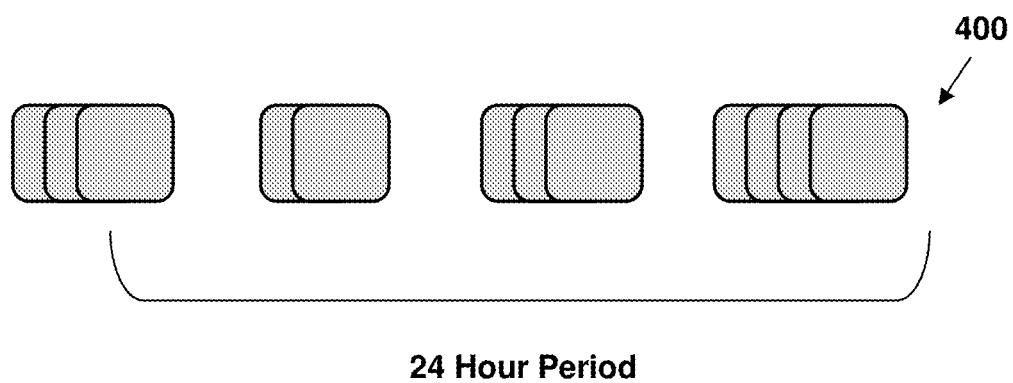

Selecting the media items based on the scenes/collection may enable a user to see a compilation that provides a more coherent view of media items. For example, as shown in FIG. 4C, a subset of the media items within the 24 hour period may be selected based on the scenes/collections so that only scenes/collections wholly included within the 24 hour period are selected. As shown in FIG. 4D, a superset of media items included within the 24 hours period may be selected based on the scenes/collections so that all scenes/collections what are wholly or partially included within the 24 hour period are selected. The selection of media items shown in FIGS. 4C-4D may make more narrative sense than the selection of media item shown in FIG. 4B.

In some implementations, the media items within the identified collection(s) may be processed to identify particular media items. For example, the media items may be separated by type (e.g., image, live image, video) and/or by time/location of capture (e.g., daytime image, nighttime image). In some implementations, the media items may be processed to determine a goodness measure of the media items. In some implementations, processing of the media items may be performed using the media items and/or reduced versions of the media items (e.g., having lower resolution, lower framerate, higher compression). In some implementations, processing of the media items may be performed using metadata associated with the media items A goodness measure may indicate the extent to which the content captured within the media items are of interest to one or more users. The criteria for determining goodness measure may be agnostic or specific as to the type of content captured within the media items. In some implementations, a goodness measure may indicate the quality of visuals captured within the media items, as determined based on one or more of resolution, brightness, contrast, color histogram, blur/sharpness, objects/faces, image capture device and/or other information about the media items. In some implementation, the goodness measure may be used to select/exclude one or more media items from a media compilation.

In some implementations, a goodness measure and the closeness (in capture time and/or capture location) of the media items may be inversely related. For example, if two media items are close together, the media items may need higher goodness rating for both media items to be selected for inclusion in a media compilation.

The media compilation component 108 may be configured to generate one or more media compilations. In some implementations, a media compilation may be generated as one or more files that include some or all of the media items within the identified collection(s). For example, a media compilation may be generated as a slide presentation including the images/videos within the identified collection(s) and/or as a video summary including the images/videos within the identified collection(s). In some implementations, a media compilation may be generated as instructions/information identifying the media items included in the media compilations. The instructions/information may be used to create a view of the media compilation.

In some implementations, the media compilation may include/be associated with one or more audio tracks (e.g., musical tracks). The audio track(s) may provide an accompaniment for the media compilation (e.g., provide the musical track(s) during playback of the media compilation). In some implementations, the media items included in the media compilation may be synchronized to the audio track(s).

The media compilation(s) may include one or more of the media items included in the identified collection(s) and/or other media items. A media compilation may include all of the media items included in the identified collection(s). A media compilation may include some (e.g., a subset) of the media items included in the identified collection(s). In some implementations, the subset of the media items may be included in the media compilation based on content of the subset of the media items and/or other information. In some implementations, one or more of the media items within the identified collection(s) may be selected for inclusion in the media items based on highlight moments. Highlight moments may be manually generated (e.g., based on user input/identification) or automatically generated (e.g., based on computer vision, metadata analysis). In some implementations, one or more of the media items within the identified collection(s) may be selected for inclusion in the media items based on computer vision. Computer vision may be used to identify one or more of objects, persons, activities, environments, scenes, actions, emotions, and/or other visuals captured within the media items. The identification of the content may be used to filter out undesired/filter in desired media items. In some implementations, one or more media items within the identified collection(s) may be removed as containing duplicative visual content.

In some implementations, the media compilation(s) may exclude one or more of the media items included in one or more collections/scenes of the identified collection(s). For example, referring to FIG. 3E, the identified collection may include the collection 360. The media compilation(s) may exclude one or more media items included within the collection 355 and/or one or more of the scenes 330, 340, 345. The media items may be excluded to provide better compacity and/or diversity within the media compilation(s).

In some implementations, one or more media compilations may be generated based on one or more triggers. Triggers may be time-based. For example, media compilation(s) may be generated on a period basis (e.g., weekly, monthly). Triggers may be media-based. For example, media compilation(s) may be generated based on a certain amount of media items being obtained for clustering into scenes/collections and/or for generating media compilation(s). Triggers may be location-based. For example, media compilation(s) may be generated based on detecting certain capture locations (e.g., new capture location) for obtained media items. Triggers may be user-based. For example, media compilation(s) may be generated based on one or more user input (e.g., user input to create/view a media compilation). Other triggers are contemplated.

In some implementations, one or more notification may be provided to a user regarding the availability of media compilations. In some implementations, reduced versions of media items may be used to provide an initial view of the media items in the media compilations. For example, reduced versions of the media items may be used to provide a preview of the clustered (in collections/scenes) media items. The preview may be displayed in conjunction with the notification(s) and/or may be displayed in response to a user's selection to see a preview of the media compilation(s).

In response to a user's selection to view the actual media compilation(s), the media items may be used to provide the view of the media compilation(s). Such separate preview and actual views of the media compilation(s) may allow for conservation of resources (e.g., processing, time, storage). For example, usage of reduced versions of the media items may allow for providing notifications/previews using light-load processing, while heavy-load processing may be used to provide a view of the media compilation(s) using actual media items. In some implementations, heavy-load processing may include obtaining media item (e.g., downloading media items), analysis of media items (e.g., computer vision), and/or more in-depth analysis of the media items (light analysis may be used for the previews). In some implementations, heavy-load processing may provide for additional refinements of media compilations. For example, media items may be further clustered/discarded based on/after the heavy-load processing. In some implementations, the user may be provided with one or more options to perform one or more operations (e.g., editing, sharing, downloading, uploading) on the media compilations/media items.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

One or more components described herein may be operatively linked via one or more electronic communication links to one or more external resources. External resource(s) may include sources of information, hosts, and/or other entities outside of the system(s) described herein, external entities participating with the system(s) described herein, computing platforms, and/or other resources. In some implementations, some or all of the functionality attributed to components described herein may be provided by resources included in external resource(s).

Figure 2:
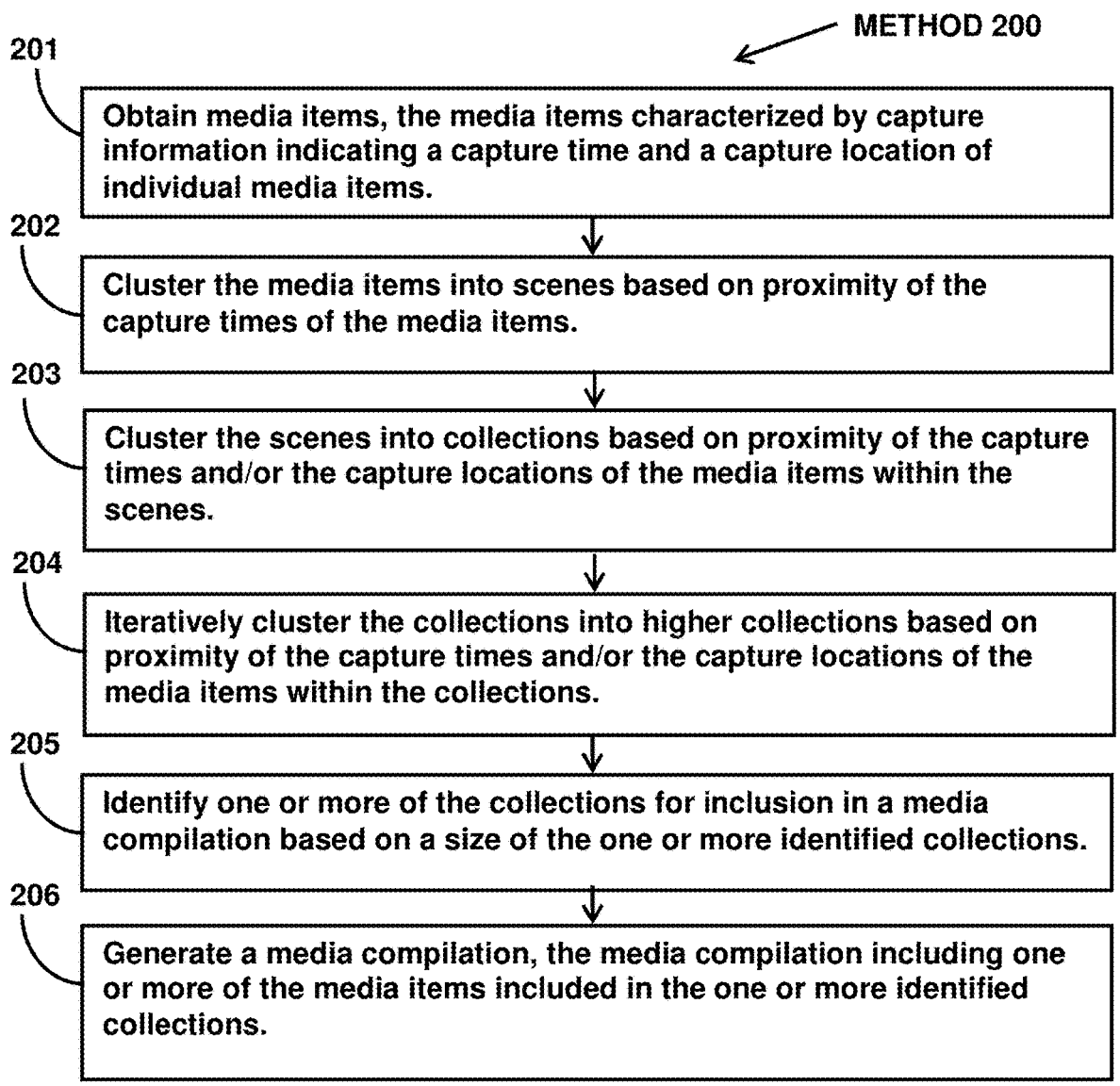
FIG. 2 illustrates a method for creating compilations based on hierarchical clustering.

FIG. 2 illustrates method 200 for creating compilations based on hierarchical clustering. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, media items may be obtained. The media items may be characterized by capture information indicating a capture time and a capture location of individual media items. In some implementation, operation 201 may be performed by a processor component the same as or similar to the media component 102 (Shown in FIG. 1 and described herein).

At operation 202, the media items may be clustered into scenes based on proximity of the capture times of the media items. In some implementations, operation 202 may be performed by a processor component the same as or similar to the cluster component 104 (Shown in FIG. 1 and described herein).

At operation 203, the scenes may be clustered into collections based on proximity of the capture times and/or the capture locations of the media items within the scenes. In some implementations, operation 203 may be performed by a processor component the same as or similar to the cluster component 104 (Shown in FIG. 1 and described herein).

At operation 204, the collections may be iteratively clustered into higher collections based on proximity of the capture times and/or the capture locations of the media items within the collections. In some implementations, operation 204 may be performed by a processor component the same as or similar to the cluster component 104 (Shown in FIG. 1 and described herein).

At operation 205, one or more of the collections may be identified for inclusion in a media compilation based on a size of the one or more identified collections. In some implementations, operation 205 may be performed by a processor component the same as or similar to the identification component 106 (Shown in FIG. 1 and described herein).

At operation 206, a media compilation may be generated. The media compilation may include one or more of the media items included in the one or more identified collections. In some implementations, operation 206 may be performed by a processor component the same as or similar to the media compilation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that creates compilations based on hierarchical clustering, the system comprising:
  one or more physical processors configured by machine-readable instructions to:
    obtain media items, the media items including two or more images, the media items characterized by capture information indicating a capture time and a capture location of individual media items;
    cluster the media items into scenes based on proximity of the capture times of the media items;
    cluster the scenes into collections based on proximity of the capture times, the capture locations, or the capture times and the capture locations of the media items within the scenes;

iteratively cluster lower collections into higher collections based on proximity of the capture times, the capture locations, or the capture times and the capture locations of the media items within the lower collections, the iterative clustering resulting in a hierarchy of a scene level and two or more collection levels;

identify multiple ones of the collections within the hierarchy for potential inclusion in a media compilation of some or all of the media items included in the identified collections, the media compilation providing a view of the media items organized into the hierarchy, wherein the identified collections are identified based on sizes of the collections, the sizes of the collections characterizing extents of the collections; and generate the media compilation, the media compilation including some or all of the media items included in the identified collections;

wherein identification of the multiple ones of the collections within the hierarchy for potential inclusion in the media compilation of some or all of the media items included in the identified collections includes:

identification of multiple potential collections;

identification of a subset of the identified potential collections for inclusion in the media compilation of some or all of the media items included in the subset of the multiple potential collections;

wherein:

the identified potential collections include a first combination of collections and a second combination of collections, the first combination of collections including a first collection and a second collection, the second combination of collection including the first collection and a third collection;

the first collection is more proximate to the second collection than the third collection within the hierarchy;

the first combination of collections is identified as the subset of the identified potential collections based on a first preference to include collections with closer proximity within the media compilation; and the second combination of collections is identified as the subset of the identified potential collections based on a second preference to include collections with farther proximity within the media compilation.

2. The system of claim 1, wherein the identified collections are identified for inclusion in the media compilation further based on a compacity of the media items within the collections, the compacity of the media items within the collections determined based on differences in the capture times of the media items within the collections.

3. The system of claim 2, wherein the identified collections are identified for inclusion in the media compilation further based on a diversity of the media items within the collections, the diversity of the media items within the collections determined based on a standard deviation of the capture times of the media items within the collections.

4. The system of claim 1, wherein the one or more physical processors are further configured by the machine-readable instructions to obtain additional media items, the additional media items clustered without altering the majority of existing collections.

5. The system of claim 1, wherein the media compilation includes all of the media items included in the identified collections.

6. The system of claim 1, wherein the media compilation includes a subset of the media items included in the identified collections, the subset of the media items included in the media compilation based on content of the subset of the media items.

7. A method for creating compilations based on hierarchical clustering, the method comprising:

obtaining media items, the media items including two or more images, the media items characterized by capture information indicating a capture time and a capture location of individual media items;

clustering the media items into scenes based on proximity of the capture times of the media items;

clustering the scenes into collections based on proximity of the capture times, the capture locations, or the capture times and the capture locations of the media items within the scenes;

iteratively clustering lower collections into higher collections based on proximity of the capture times, the capture locations, or the capture times and the capture locations of the media items within the lower collections, the iterative clustering resulting in a hierarchy of a scene level and two or more collection levels;

identifying multiple ones of the collections within the hierarchy for potential inclusion in a media compilation of some or all of the media items included in the identified collections, the media compilation providing a view of the media items organized into the hierarchy, wherein the identified collections are identified based on sizes of the collections, the sizes of the collections characterizing extents of the collections; and generating the media compilation, the media compilation including some or all of the media items included in the identified collections wherein identification of the multiple ones of the collections within the hierarchy for potential inclusion in the media compilation of some or all of the media items included in the identified collections includes:

identification of multiple potential collections;

identification of a subset of the identified potential collections for inclusion in the media compilation of some or all of the media items included in the subset of the multiple potential collections;

wherein:

the identified potential collections include a first combination of collections and a second combination of collections, the first combination of collections including a first collection and a second collection, the second combination of collection including the first collection and a third collection;

the first collection is more proximate to the second collection than the third collection within the hierarchy;

the first combination of collections is identified as the subset of the identified potential collections based on a first preference to include collections with closer proximity within the media compilation; and the second combination of collections is identified as the subset of the identified potential collections based on a second preference to include collections with farther proximity within the media compilation.

8. The method of claim 7, wherein the identified collections are identified for inclusion in the media compilation further based on a compacity of the media items within the collections, the compacity of the media items within the collections determined based on differences in the capture times of the media items within the collections.

9. The method of claim 8, wherein the identified collections are identified for inclusion in the media compilation further based on a diversity of the media items within the collections, the diversity of the media items within the collections determined based on a standard deviation of the capture times of the media items within the collections.

10. The method of claim 7, further comprising obtaining additional media items, the additional media items clustered without altering the majority of existing collections.

11. The method of claim 7, wherein the media compilation includes all of the media items included in the identified collections.

12. The method of claim 7, wherein the media compilation includes a subset of the media items included in the identified collections, the subset of the media items included in the media compilation based on content of the subset of the media items.

13. The system of claim 1, wherein the sizes of the collections indicate amounts of media items within the collections and the identified collections are identified based on the amounts of media items within the collections such that the media compilation includes a certain number of media items, includes a number of media items within a range of media item, includes less than the certain number of media items, or includes more than the certain number of media items.

14. The system of claim 1, wherein the sizes of the collections indicate amounts of scenes within the collections and the identified collections are identified based on the amounts of scenes within the collections such that the media compilation includes a certain number of scenes, includes a number of scenes within a range of scenes, includes less than the certain number of scenes, or includes more than the certain number of scenes.

15. The system of claim 1, wherein the sizes of the collections indicate time durations covered by the media items or the scenes within the collections such that the media compilation includes a certain time duration, includes time durations within a range of time durations, includes less than the certain time duration, or includes more than the certain time duration.

16. The system of claim 1, wherein the sizes of the collections indicate capture locations covered by the media items or the scenes within the collections such that the media compilation includes a certain capture location, includes capture locations within a range of capture locations, includes less than the certain capture location, or includes more than the certain capture location.

* * * * *